(12) United States Patent
Furukawa et al.

(10) Patent No.: US 6,178,268 B1
(45) Date of Patent: Jan. 23, 2001

(54) METHOD OF AND APPARATUS FOR PROCESSING IMAGE

(75) Inventors: Itaru Furukawa; Fujio Akioka, both of Kyoto (JP)

(73) Assignee: Dainippon Screen Mfg. Co., Ltd., Kyoto (JP)

( * ) Notice: Under 35 U.S.C. 154(b), the term of this patent shall be extended for 0 days.

(21) Appl. No.: 09/045,046

(22) Filed: Mar. 20, 1998

(30) Foreign Application Priority Data

Mar. 27, 1997 (JP) .................................................. 9-075269
Mar. 31, 1997 (JP) .................................................. 9-079882

(51) Int. Cl.[7] ...................................................... G06K 9/40
(52) U.S. Cl. ......................... 382/260; 382/272; 382/274; 358/448; 358/454
(58) Field of Search .................... 382/260, 261, 382/264, 272, 274; 358/447, 448, 463, 454

(56) References Cited

U.S. PATENT DOCUMENTS

| 5,392,137 | * | 2/1995 | Okubo ................................. 358/448 |
| 5,410,619 | * | 4/1995 | Fujisawa et al. ..................... 358/447 |
| 5,760,922 | * | 6/1998 | Kojima ................................. 358/448 |
| 6,041,145 | * | 3/2000 | Hayashi et al. ....................... 382/268 |

* cited by examiner

*Primary Examiner*—Thomas D. Lee
(74) *Attorney, Agent, or Firm*—McDermott, Will & Emery

(57) ABSTRACT

The present invention is directed to a method of and an apparatus for applying predetermined processing to an original image pixel by pixel. A main signal (S) regarding an objective pixel which is a pixel which is to be processed is supplied to an average density value extracting portion (10), a multiplier (51), and a filter computation portion (30). The filter computation portion (30) executes computation based on an image filter which has a larger size than the size of halftone dots, to thereby generates a filtered signal (S'). The average density value extracting portion (10) extracts an average density value (D) in an area which is larger than the size of the halftone dots, and supplies the average density value (D) to a table reference portion (20). The table reference portion (20) identifies a mixing rate (M) for mixing in the main signal (S) and a mixing rate (1−M) for mixing in the filtered signal (S'), in accordance with the average density value (D). The multiplier (51) generates a signal (Sa (=M·S)) while a multiplier (52) generates a signal (Sb (=(1=M)·S')). Following this, an adder (53) mixes these signals with each other, thereby generating an output signal (S"). As such processing is performed on the entire image, a deterioration in an image quality is suppressed in an excellent manner and moires are removed without deteriorating an edge of the image. Further, a contrast in the vicinity of the objective pixel may be calculated and a mixing rate (M) may be found in accordance with the contrast. In this case as well, it is possible to obtain an image which has an excellent quality.

14 Claims, 8 Drawing Sheets

FIG. 11
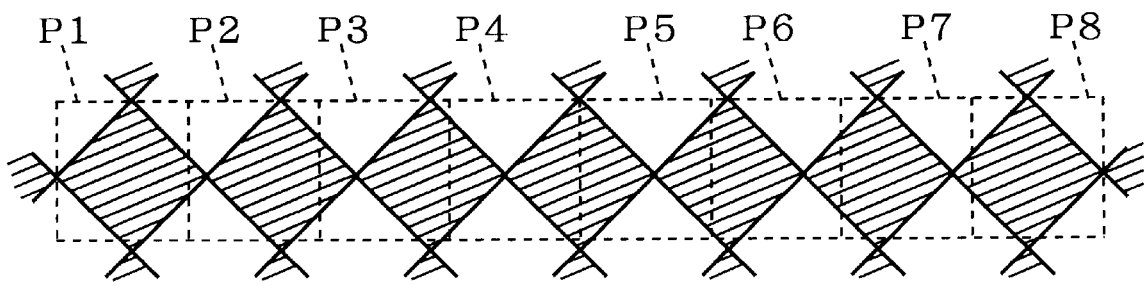
FIG. 12
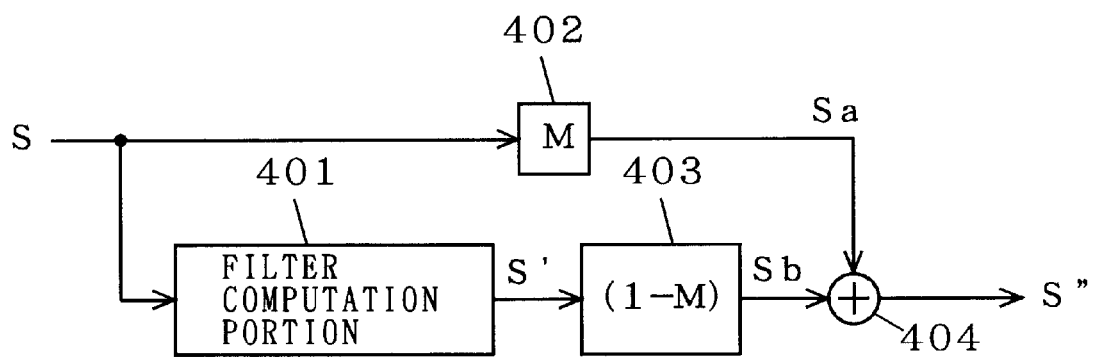
FIG. 13
| 1 | 2 | 4 | 2 | 1 |
|---|---|---|---|---|
| 2 | 4 | 8 | 4 | 2 |
| 4 | 8 | 16 | 8 | 4 |
| 2 | 4 | 6 | 4 | 2 |
| 1 | 2 | 4 | 2 | 1 |

| 64 | 53 | 42 | 26 | 27 | 43 | 54 | 61 |
| 60 | 41 | 25 | 14 | 15 | 28 | 44 | 55 |
| 52 | 40 | 13 | 5  | 6  | 16 | 29 | 45 |
| 39 | 24 | 12 | 1  | 2  | 7  | 17 | 30 |
| 38 | 23 | 11 | 4  | 3  | 8  | 18 | 31 |
| 51 | 37 | 22 | 10 | 9  | 19 | 32 | 46 |
| 59 | 50 | 36 | 21 | 20 | 33 | 47 | 56 |
| 63 | 58 | 49 | 35 | 34 | 48 | 57 | 62 |

B1 (top-left), B2 (top-right), B4 (bottom-left), B3 (bottom-right)

| B1 20 | B2 10 |
| B4 20 | B3 10 |

F I G. 1 5
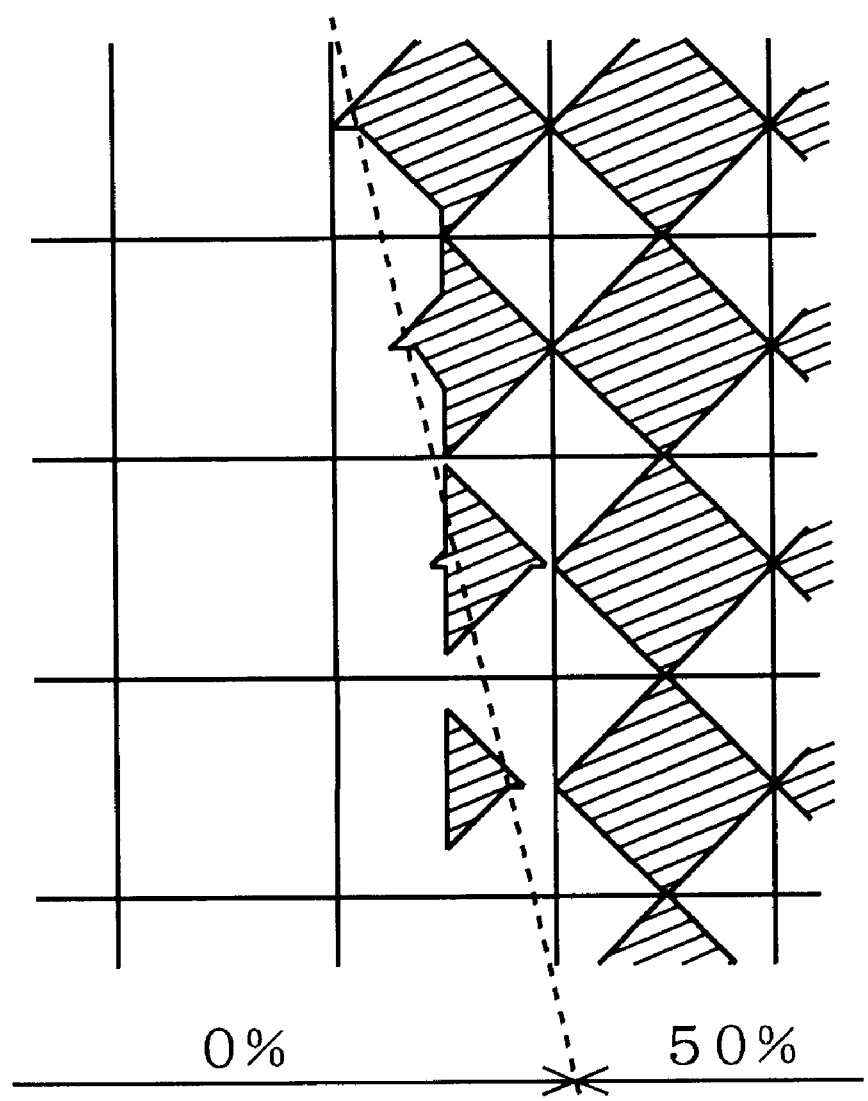

METHOD OF AND APPARATUS FOR PROCESSING IMAGE

BACKGROUND OF THE INVENTION

1. Field of the Invention

The present invention relates to a method of and an apparatus for processing a digital image which is obtained from a scanner, a digital camera or other apparatuses.

2. Description of the Background Art

A printed matter is customarily created by printing halftone dots. A printed matter which is printed in halftone dots has a resolution of about 65 to 200 dpi.

FIG. 11 shows a case that an image inputting portion such as a scanner reads a printed matter which is printed in halftone dots. FIG. 11 is a view of a positional relationship between halftone dots and pixels which are to be read, and the illustrated halftone dot image which is an original image has a density of 50%. In other words, the shadowed regions in FIG. 11 are a portion where halftone dots are recorded. Now, a description will be given on a case where such an original image is read as pixels P1 to P8 whose size is indicated as the dotted frames.

The size of one pixel shown in FIG. 11 is about 87.5% of the size of one halftone dot. In such a case, densities which are measured in the pixels P4 and P5 are 50% which is the same as the density of the original image, and therefore, a consistency is ensured. However, densities which are measured in the pixels P1 and P8 are higher than 50% since much blackened region where the halftone dot is blackened is contained in a pixel region of each one of the pixels P1 and P8. In reality, the densities in the pixels P1 and P8 are about 62%. Meanwhile, densities which are measured in the pixels P2, P3, P6 and P7 are also higher than 50%. Thus, the densities which are measured in the pixels P1, . . ., P8 periodically change between 50% and about 62%. Considering that the density of the original image is 50%, this is a deterioration in the quality of the image.

A cause of this is interference which is created due to differences between the halftone dot size of the original image and the pixel size of the pixels which are to be read. Hence, as the pixel size becomes smaller than the halftone dot size, the densities of the halftone dots are read rather than the density of the original image are read, which leads to greater changes in the density between the pixels. Further, when the pixel size is close to the halftone dot or in a similar situation, a cycle of the density change becomes longer, which appears as moires which are visually noticeable.

Moires are noticeable where a density level is flat. In reality, although moires are not very noticeable in a middle density range where a density is 50%, moires appear remarkably noticeable in a high density range where a density is higher or in a low density range where a density is lower and degrades the quality of an image.

The phenomenon described above occurs also when a similar condition to the above is satisfied regarding a relationship between a pixel size and a pattern of a general original image which is expressed by other method except for halftone dots, a pattern of an object, or the like. In short, in some cases, moires are created from an image which is obtained by reading a transparent original or a reflective original with a scanner and from an image which is obtained with a digital camera.

To eliminate moires and prevent a deterioration in the quality of an image, image processing using an image filter is customarily performed.

FIG. 12 is a schematic structure diagram of a conventional image processing apparatus. After inputted, a main signal S regarding a pixel which is to be processed (hereinafter an "objective pixel") is supplied to a filter computation portion 401 and a main signal adjusting portion 402. The filter computation portion 401 subjects the main signal S to filter computation which is performed by a two-dimensional image filter, whereby a filtered signal S' is generated. Following this, the main signal adjusting portion 402 generates a signal Sa (=M·S) which is equal to the main signal S as it is multiplied by M, based on a mixing rate M which is set in advance with respect to the main signal S, where M is a figure which satisfies "$0 \leq M < 1$". On the other hand, the filtered signal S' which is generated by the filter computation portion 401 is processed into a signal Sb (=(1−M)·S') which is equal to the filtered signal S' as it is multiplied by (1−M), based on a mixing rate (1−M) which is set to a filtered signal adjusting portion 403 in advance with respect to the filtered signal S'. An adder 404 mixes (adds) the signal Sa from the main signal adjusting portion 402 with the signal Sb from the filtered signal adjusting portion 403, and accordingly generates an output signal S".

In such a conventional image processing apparatus described above, for the purpose of removing moires and preventing a deterioration in the quality of an image, the filter computation portion 401 executes filter computation using an image filter which has a predetermined size. FIG. 13 shows one example of an image filter which is used at this stage. In such a conventional image processing apparatus, the size of an image filter is set about double the size of or larger than the size of each halftone dot. Hence, in the case of the image filter which is shown in FIG. 13, for example, the size of one pixel is about ⅔ of or larger than the size of halftone dots. In the conventional image processing apparatus, the filter computation portion 401 aligns the center of the image filter to an objective pixel, calculates a weighted mean of the respective density values in accordance with weighting factors which are assigned to the objective pixel and surrounding pixels around the same, and outputs the weighted mean as the filtered signal S'. That is, to calculate a weighted mean in an area which is larger than the size of the halftone dots, a frequency component of a halftone dot pattern is removed from the filtered signal S', and therefore, the filtered signal S' has a density value from which an influence of the size of the halftone dots is removed. Hence, a cause of moires and a deterioration in an image quality is removed from the filtered signal Since the main signal S and the filtered signal S' are mixed with each other at a mixing ratio of M:(1−M), the smaller the value of the mixing rate M is, the larger the mixing rate (1−M) for the filtered signal S' is, so that a rate at which the filtered signal S' is reflected in the output signal S" becomes larger. In other words, the effect of the image processing using the image filter is dependent upon the mixing rate M which is set in advance.

While it is possible for an operator to set the value of the mixing rate M before starting the image processing, once the processing of an original image is started, the value of the mixing rate M remains fixed until the processing completes.

By the way, in general, an edge portion of an image of a printed matter which is recorded in halftone dots is reproduced with a higher resolution than a halftone dot size. FIGS. 14A, 14B and 14C are explanatory diagrams showing a conventional method of generating one halftone dot. As shown in FIG. 14A, a region which indicates the size of one halftone dot is divided into four blocks B1, . . ., B4, and each block is further divided into blackened regions. A threshold value is set for each blackened region, as shown in FIG. 14A. On the other hand, when a density value which is obtained by reading an original image is "20" at positions which correspond to the blocks B1 and B4 but "10" at positions which correspond to the blocks B2 and B3 as shown in FIG. 14B, the density value is compared with the threshold values which are shown in FIG. 14A and the regions are blackened one by one, starting at the center of the halftone dot. In this manner, the halftone dot as that shown in FIG. 14C is recorded.

FIG. 15 shows a case where an edge portion of an image is recorded by such a recording method. FIG. 15 illustrates an edge portion of a halftone dot image, and the dotted line in FIG. 15 indicates an edge of the image. The right-hand side of the dotted line is where a density is 50%, while the left-hand side of the dotted line is where a density is 0%. Square areas which are defined by the lattice respectively indicate the respective halftone dot regions. As shown in FIG. 15, since halftone dots are recorded in accordance with density values which correspond to the respective four divided blocks in the edge portion of the halftone dot image, the image is reproduced with a high resolution. A middle density range of an original image contains relatively many such edge portions of the halftone dot image which are reproduced with a high resolution.

However, while the conventional image processing apparatus executes smoothing using the image filter as that shown in FIG. 13 for the purpose of avoiding moires and a deterioration in the quality of an image, since the mixing ratio of M:(1−M) for mixing the main signal S and the filtered signal S' with each other is always constant regardless of a density range of an image during generation of the output signal S", and further, since the mixing ratio of M:(1−M) is always constant over the entire one image, such an edge portion of the image above which is reproduced with a high resolution as well is smoothed out and smudged.

SUMMARY OF THE INVENTION

The present invention is directed to an image processing method of applying predetermined processing to an original image pixel by pixel.

The image processing method according to the present invention comprises the steps of: a) applying an image filter which has a predetermined size to a main signal representing a density of an objective pixel to generate a filtered signal; b) obtaining a mixing ratio for mixing the main signal and the filtered signal with each other; and c) mixing the main signal and the filtered signal with each other based on the mixing ratio to generate an output signal.

The proportion of the main signal in the output signal is controlled by the mixing ratio. In other words, adjustment of the mixing ratio makes excellent suppression of a degraded image quality and removal of the moires possible, without deteriorating an edge of an image.

In one aspect of the present invention, the step b) comprises the steps of: b-1) calculating average density values from a pixel group which contains the objective pixel and neighboring pixels around the objective pixel; and b-2) obtaining the mixing ratio in accordance with the average density values.

Hence, it is possible to change the effect of the image processing using the image filter in accordance with a density range of an original image. This makes excellent suppression of a degraded image quality and removal of the moires possible, without deteriorating an edge of an image.

Alternatively, according to other aspect of the present invention, the step b) comprises the step of b-1) obtaining the mixing ratio in accordance with a value of the filtered signal.

Alternatively, according to still other aspect of the present invention, the step b) comprises the steps of: b-1) performing smoothing processing on each one of a plurality of neighboring pixels which are located in the vicinity of the objective pixel, in a predetermined region around each one of the plurality of the neighboring pixels, to thereby calculate an average density value regarding each one of the plurality of the neighboring pixels; b-2) calculating a contrast regarding the objective pixel based on a plurality of the average density values which are obtained from the plurality of the neighboring pixels; and b-3) obtaining the mixing ratio in accordance with the contrast.

Hence, the effect of the processing using the image filter in accordance with the contrast of an original image is realized in the output signal, which in turn makes it possible to prevent moires, a deterioration in the quality of an image and the like without deteriorating an edge of the image.

The present invention is also directed to an image processing apparatus for applying predetermined processing to an original image pixel by pixel.

Accordingly, an object of the present invention is to achieve excellent suppression of a degraded image quality and removal of moires, without deteriorating an edge of an image.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 8A and 8B are explanatory diagrams for describing a positional relationship of an upper neighboring pixel and the like;

FIG. 11 is a view showing a relationship between halftone dots and pixels which are to be read;

FIG. 12 is a schematic structure diagram of a conventional image processing apparatus;

FIG. 13 is a view showing one example of an image filter;

FIG. 15 is a view showing an edge portion of a halftone dot image.

DESCRIPTION OF THE PREFERRED EMBODIMENTS

<1. Overall Structure Of Apparatus>

Figure 1:
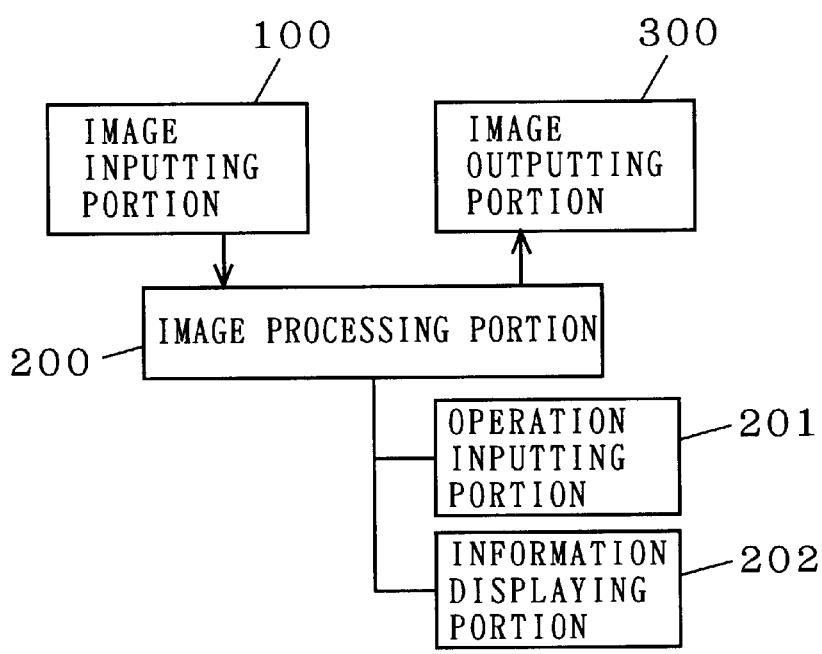
FIG. 1 is a schematic diagram showing an overall structure of an apparatus to which preferred embodiments of the present invention are applied.

First, one example of an overall structure of an apparatus to which preferred embodiments of the present invention are applied will be described. FIG. 1 is a schematic diagram showing an overall structure of an apparatus to which the present invention is applied. An image inputting portion 100, like an input scanner, optically reads an original and creates original image data which indicate a multi-level density value of each pixel. The original image data which are created are transferred to an image processing portion 200. The image processing portion 200 is a processing portion to which image processing apparatuses according to the preferred embodiments of the present invention are applied. After processed through image processing which uses an image filter according to the preferred embodiments of the present invention and through other predetermined processing in the image processing portion 200, the original image data are outputted to an image outputting portion 300 such as an output scanner. In the image outputting portion 300, the original image data are recorded to a recording medium such as a film. An operation inputting portion 201, such as a keyboard and a mouse, and an information displaying portion 202, such as a display, are disposed so that the image inputting portion 100, the image processing portion 200 and the image outputting portion 300 perform desired operations which are wanted by an operator.

<2. Outline Of Image Processing>

Next, a manner in which the image processing apparatuses according to the preferred embodiments of the present invention perform processing will be described. The image processing apparatuses according to the preferred embodiments of the present invention perform image processing using an image filter, aiming at prevention of moires and a degraded image quality. That is, by scanning an image filter which is in the form of a matrix of M×N (M and N are odd numbers which are equal or larger than 3) within a plane of an image, the image is smoothed out or otherwise processed.

Figure 2A:
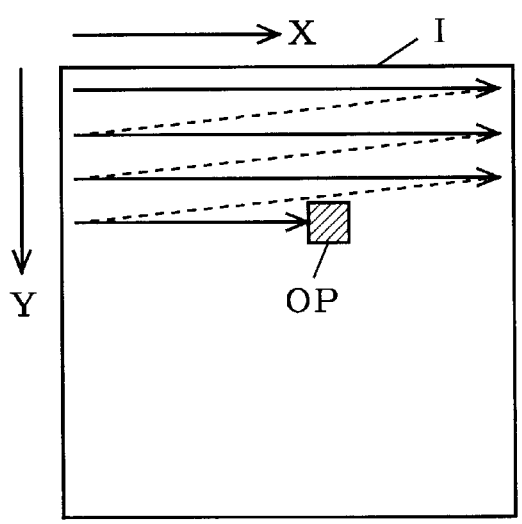
FIGS. 2A and 2B are explanatory diagrams showing an outline of image processing according to the preferred embodiments of the present invention.
Figure 2B:
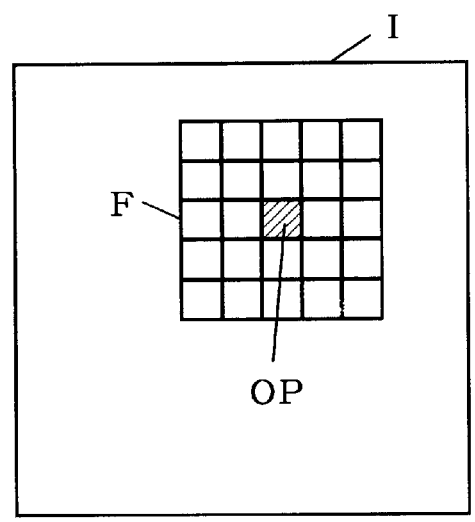

FIGS. 2A and 2B are explanatory diagrams showing an outline of the image processing according to the preferred embodiments of the present invention. An image I which is shown in FIG. 2A is sequentially processed, as an objective pixel OP is scanned over pixel by pixel, where an X-direction (horizontal direction) is a main scanning direction and a Y-direction (vertical direction) is a sub scanning direction. During the processing using an image filter, the objective pixel OP is positioned at the center of an image filter F as shown in FIG. 2B. In the example shown in FIG. 2B, the image filter F which is in the form of a matrix of 5×5 (M=N=5) is used. In accordance with weighting factors which are assigned to respective components of the image filter F, a weighted mean of a density value of the objective pixel OP and density values of pixels around the objective pixel OP is calculated. The calculated value is used as a filtered signal which represents the objective pixel OP.

Figure 3:
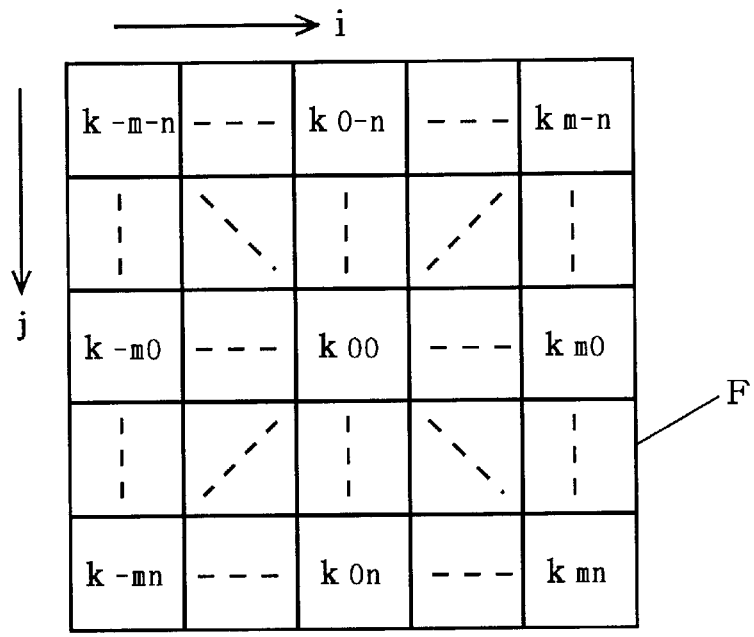
FIG. 3 is a view showing weighting factors of respective components of an image filter.

In other words, it is assumed that the image filter F is a matrix whose size is (2m+1)×(2n+1) as shown in FIG. 3 and that weighting factors $k_{-m-n}$ to $k_{mn}$ are assigned to the respective components of the image filter F. A filtered signal S'xy, which is obtained by filter-computing the objective pixel OP which is positioned at a coordinate (x, y) on the image plane using the image filter F, is expressed as:

$$S'xy = \frac{\sum_{i=-m}^{m} \sum_{j=-n}^{n} k_{ij} \cdot s_{x+i,y+j}}{\sum_{i=-m}^{m} \sum_{j=-n}^{n} k_{ij}} \quad \text{Eq. 1}$$

where Sx,y is a density value of a pixel which is positioned at a coordinate (x, y) on the image plane of the original image.

When the weighting factors which correspond to the objective pixel and the neighboring pixels in the image filter which is shown in FIG. 3 are all positive numbers, the image filter serves as an image filter for smoothing out an image. Thus, a frequency characteristic of the weighting factors is a characteristic of the image filter.

<3. First Preferred Embodiment>

Figure 4:
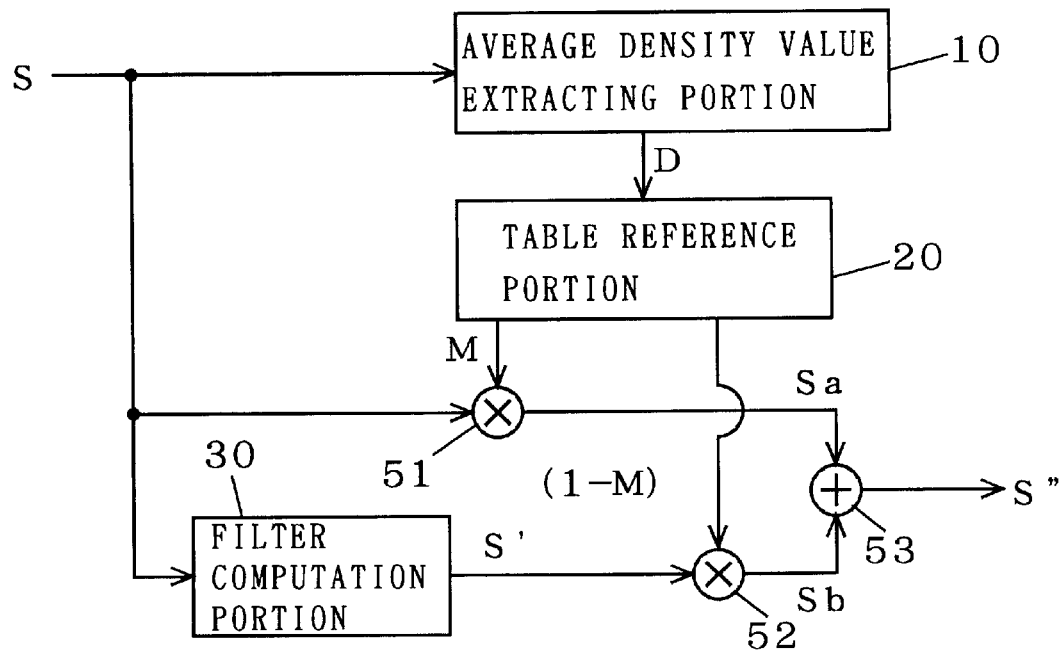
FIG. 4 is a schematic structure diagram of an image processing apparatus according to a first preferred embodiment of the present invention.

Now, an image processing apparatus according to a first preferred embodiment of the present invention will be described. FIG. 4 is a schematic structure diagram of an image processing apparatus according to the first preferred embodiment. A main signal S regarding an objective pixel is supplied to an average density value extracting portion 10, a multiplier 51, and a filter computation portion 30.

The average density value extracting portion 10 calculates an average density value D for a pixel group which contains the objective pixel and neighboring pixels around the objective pixel. It is preferable that an area of the objective pixel and the neighboring pixels for calculating the average density value D is set larger than the size of each halftone dot of an original image (strictly describing, a size which corresponds to halftone dots of 100%), so that the configurations of the halftone dots are not detected. This is because if the area to be smoothed out is not sufficiently large, between a case where the area is close to the center of each halftone dot and a case where the area is not close to the center of each halftone dot, the average density value D may have a different density value from a density value which the original image is supposed to originally have. In this manner, the average density value D is a density value the original image originally has which is not affected by the halftone dots. A method of calculating the average density value D may be simple averaging for a pixel group which contains the objective pixel and neighboring pixels, or may be weighted averaging. The average density value D which is calculated by the average density value extracting portion 10 is supplied to a table reference portion 20.

Figure 5:
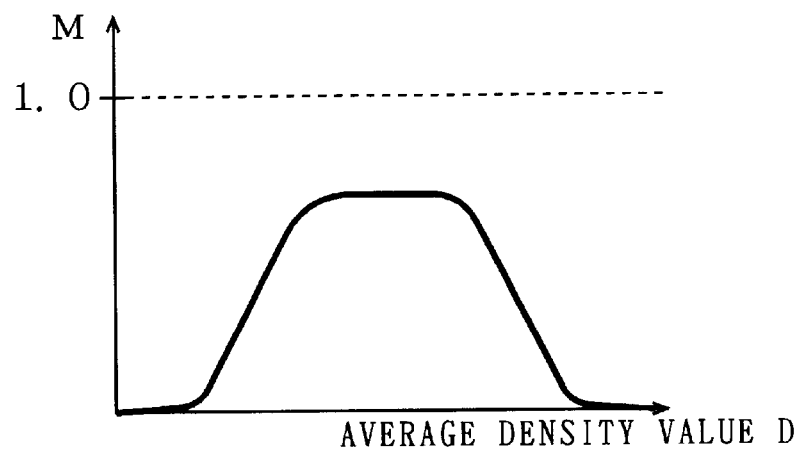
FIG. 5 is a view showing a relationship between an average density value and a mixing rate in the first preferred embodiment.

The table reference portion 20 identifies a mixing rate M in accordance with the average density value D which is supplied thereto. FIG. 5 shows a relationship between the average density value D and the mixing rate M. As shown in FIG. 5, the mixing rate M can have a value which satisfies "0≦M<1". The value of the mixing rate M becomes smaller as the average density value D shifts to a high density range or to a low density range, whereas the value of the mixing rate M is large when the average density value D remains in a middle density range. The table reference portion 20 stores a table which represents the relationship which is shown in FIG. 5 in a storage element such as a memory. Receiving the average density value D, the table reference portion 20 refers to the table and acquires the corresponding mixing rate M. Since the mixing rate M which is obtained in this manner indicates a rate at which the main signal S is mixed into the output signal, the table reference portion 20 identifies a mixing rate (1−M) for the filtered signal based on the mixing rate M. Hence, a possible value of the mixing rate (1−M) is in the range of "0<(1−M)≦1". Following this, the mixing rate M is supplied to the multiplier 51, while the mixing rate (1−M) is supplied to a multiplier 52.

The multiplier 51 multiplies the main signal S by the mixing rate M, thereby generating a signal Sa (=M·S). The signal Sa is supplied to an adder 53.

On the other hand, the filter computation portion 30 executes filter computation using an image filter which has a predetermined size. An image filter which is used at this stage is an image filter as that shown in FIG. 13 which is similar to an image filter which is used in the conventional image processing apparatus. In the image processing apparatus according to the first preferred embodiment as well, it is preferable that the size of an image filter which is used in the filter computation portion 30 is set to be about double the size of or larger than the size of each halftone dot. In the case of the image filter which is shown in FIG. 13, for instance, the size of one pixel is about "⅖" of the size of halftone dots or larger. The filter computation portion 30 aligns the center of the image filter to an objective pixel, executes the computation which is shown as Eq. 1 based on weighting factors which are assigned to the objective pixel and neighboring pixels around the same to thereby calculate a weighted mean, and outputs the weighted mean as the filtered signal S'. A frequency component of a halftone dot pattern is removed from the filtered signal S' so as to calculate the weighted means in an area which is larger than the size of the halftone dots, and therefore, the filtered signal S' has a density value from which an influence of the halftone dots is removed. Hence, a cause of moires and a deterioration in an image quality is removed from the filtered signal S'. The filtered signal S' which is obtained in this manner is supplied to the multiplier 52.

Following this, the multiplier 52 multiplies the filtered signal S' by the mixing rate (1−M), and generates a signal Sb (=(1−M)·S'). The obtained signal Sb is supplied to the adder 53.

The adder 53 mixes (adds) the signal Sa and the signal Sb with each other, thereby generating the output signal S". The output signal S" is an output signal from the image processing apparatus according to the first preferred embodiment.

In the image processing apparatus according to the first preferred embodiment, the main signal S and the filtered signal S' are mixed with each other at a mixing ratio of "M:(1−M)". This mixing ratio is determined in accordance with the average density value D which is obtained for a pixel group which contains the objective pixel and neighboring pixels around the objective pixel. This makes it possible to change the mixing ratio in accordance with a density range of an original image. Hence, it is possible to change the effect of image processing using an image filter in accordance with a density range of the original image.

Further, since the image processing apparatus according to the first preferred embodiment requires to set a proportion of the main signal S large in the middle density range in which moires are not noticeable, the output signal S" which is outputted contains relatively many components of the main signal S, and therefore, an edge portion of the image is not degraded. In addition, since a proportion of the filtered signal S' is set large in the high density range and the low density range in which moires and a deterioration in an image quality are remarkably noticeable, the output signal S" which is outputted contains relatively many components of the filtered signal S', and therefore, it is possible to prevent moires and a deterioration in an image quality in the high density range and the low density range.

In FIG. 5, the mixing rate M is not "1" for a case where the average density value D is in the middle density range. This is to allow the output signal S" to contain the filtered signal S' so that an influence of the halftone dots is removed to an extent that an edge is not degraded. As a result, moires are removed which exist in the middle density range, although not visually noticeable.

<4. Second Preferred Embodiment>

Figure 6:
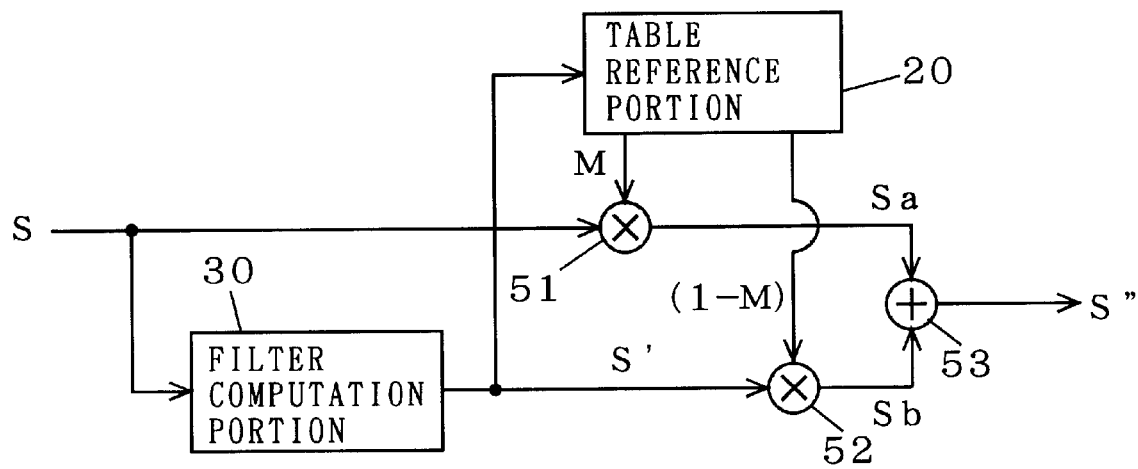
FIG. 6 is a schematic structure diagram of an image processing apparatus according to a second preferred embodiment of the present invention.

Now, an image processing apparatus according to a second preferred embodiment of the present invention will be described. FIG. 6 is a schematic structure diagram of an image processing apparatus according to the second preferred embodiment. The main signal S regarding an objective pixel is supplied to the filter computation portion 30 and the multiplier 51.

As in the first preferred embodiment, the filter computation portion 30 executes filter computation using an image filter which has a predetermined size. An image filter which is used at this stage is an image filter as that shown in FIG. 13 which is similar to an image filter which is used in the conventional image processing apparatus. In the image processing apparatus according to the second preferred embodiment as well, it is preferable that the size of an image filter which is used in the filter computation portion 30 is set to be about double the size of or larger than the size of each halftone dot. The filter computation portion 30 executes the computation which is shown as Eq. 1 based on weighting factors which are assigned to the objective pixel and neighboring pixels around the same to thereby calculate a weighted mean, and outputs the weighted mean as the filtered signal S'. A frequency component of a halftone dot pattern is removed from the filtered signal S' so as to calculate the weighted means in an area which is larger than the size of the halftone dots, and therefore, the filtered signal S' has a density value from which an influence of the halftone dots is removed. Hence, a cause of moires and a deterioration in an image quality is removed from the filtered signal S'. The filtered signal S' which is obtained in this manner is supplied to the table reference portion 20 and the multiplier 52.

The table reference portion 20 identifies the mixing rate M in accordance with the filtered signal S' which is supplied thereto. As a relationship between the filtered signal S' and the mixing rate M is similar to the relationship between the average density value D and the mixing rate M shown in FIG. 5, "AVERAGE DENSITY VALUE D" may be read as "FILTERED SIGNAL S'" in FIG. 5. That is, the mixing rate M is set such that the value of the mixing rate M becomes smaller as the filtered signal S' shifts to the high density range or to the low density range, whereas the value of the mixing rate M is large when the filtered signal S' remains in the middle density range. The table reference portion 20 stores a table which represents the relationship as above in a storage element such as a memory. Receiving the filtered signal S', the table reference portion 20 refers to the table and acquires the corresponding mixing rate M. Since the mixing rate M which is obtained in this manner indicates a rate at which the main signal S is mixed into the output signal, the table reference portion 20 identifies the mixing rate (1−M) for the filtered signal S' based on the mixing rate M. Following this, the mixing rate M is supplied to the multiplier 51, while the mixing rate (1−M) is supplied to the multiplier 52.

The multiplier 51 multiplies the main signal S by the mixing rate M, thereby generating the signal Sa (=M·S) which will be then supplied to the adder 53. The multiplier 52 multiplies the filtered signal S' by the mixing rate (1−M), and generates the signal Sb (=(1−M)·S') which will be then supplied to the adder 53.

The adder 53 mixes the signal Sa and the signal Sb with each other, thereby generating the output signal S". The output signal S" is an output signal from the image processing apparatus according to the second preferred embodiment.

In the image processing apparatus according to the second preferred embodiment, the filtered signal S' is supplied to the table reference portion 20 so that the mixing rates M and (1−M) are created. The filtered signal S' is a signal which is obtained by weighted averaging as that indicated by Eq. 1 based on an image filter as that shown in FIG. 13. Hence, even if the filtered signal S' which is obtained by weighted averaging is used instead of the average density value D which has been described in relation to the first preferred embodiment, the same effect is realized in the output signal S". Rather, if the filtered signal S' is supplied to the table reference portion 20 as in the second preferred embodiment, it is not necessary to dispose the average density value extracting portion 10 (See FIG. 4) which has been described in relation to the first preferred embodiment, and therefore, the structure is efficient and beneficial.

Thus, in the image processing apparatus according to the second preferred embodiment as well, the main signal S and the filtered signal S' are mixed with each other at the mixing ratio of "M:(1−M)", the output signal S" is generated, and the mixing ratio is determined in accordance with the filtered signal S'. This makes it possible to change the mixing ratio in accordance with a density range of an original image which is not affected by an influence of the halftone dots. Hence, it is possible to change the effect of image processing using an image filter in accordance with the density range of the original image.

Further, since the image processing apparatus according to the second preferred embodiment requires to set a proportion of the main signal S large in the middle density range in which moires are not noticeable, the output signal S" which is outputted contains relatively many components of the main signal S, and therefore, an edge portion of the image is not degraded. In addition, since a proportion of the filtered signal S' is set large in the high density range and the low density range in which moires and a deterioration in an image quality are remarkably noticeable, the output signal S" which is outputted contains relatively many components of the filtered signal S', and therefore, it is possible to prevent moires and a deterioration in an image quality in the high density range and the low density range.

<5. Third Preferred Embodiment>

Figure 7:
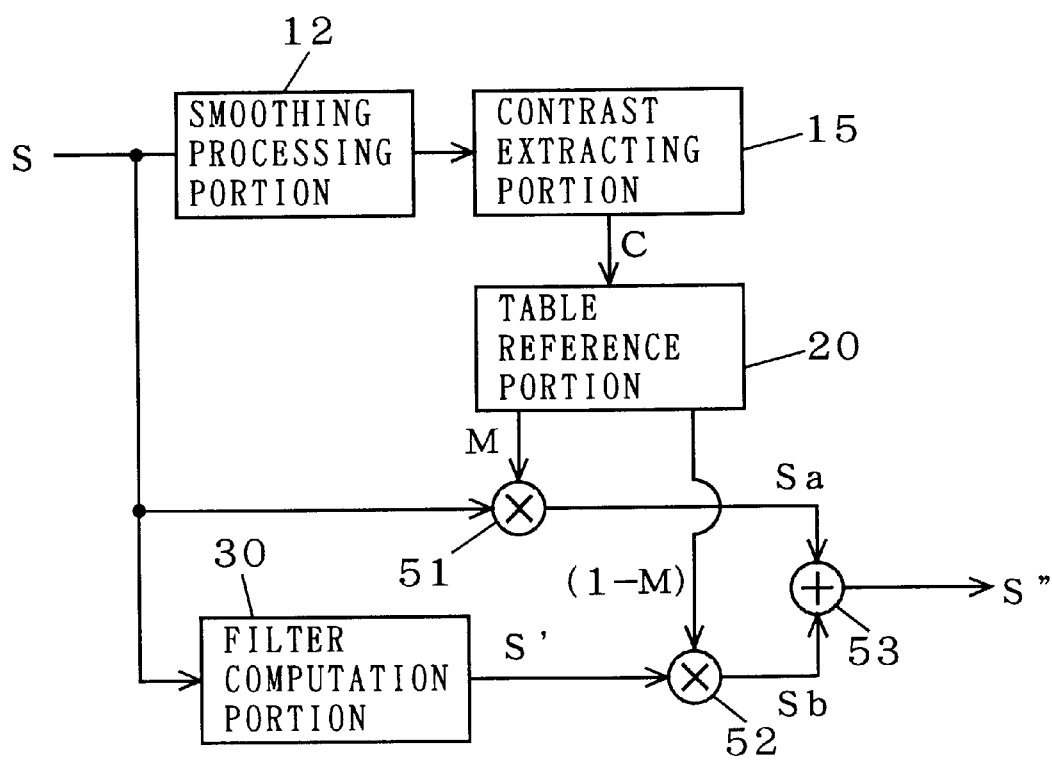
FIG. 7 is a schematic structure diagram of an image processing apparatus according to a third preferred embodiment of the present invention.

Now, an image processing apparatus according to a third preferred embodiment of the present invention will be described. FIG. 7 is a schematic structure diagram of an image processing apparatus according to the third preferred embodiment. The main signal S regarding an objective pixel is supplied to a smoothing processing portion 12, the multiplier 51, and the filter computation portion 30.

Figure 8A:
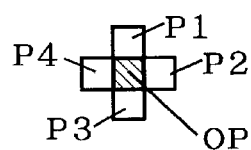
Figure 8B:
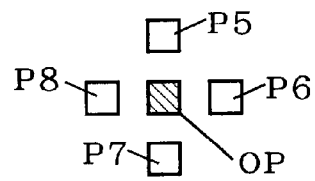

Receiving the main signal S regarding an objective pixel, the smoothing processing portion 12 executes smoothing of neighboring pixels around the objective pixel to thereby calculate an average density value. The neighboring pixels around the objective pixel from which the average density value is calculated may be four neighboring pixels around the objective pixel, i.e., a neighboring upper pixel, a neighboring lower pixel, a neighboring left-hand side pixel and a neighboring right-hand side pixel, for instance. As such neighboring pixels around the objective pixel, pixels P1, P2, P3 and P4 which are located above, to the right-hand side of, below, and to the left-hand side of the objective pixel may be used as the neighboring upper pixel, the neighboring right-hand side pixel, the neighboring lower pixel and the neighboring left-hand side pixel respectively, as shown in FIG. 8A, or alternatively, the neighboring upper pixel, the neighboring right-hand side pixel, the neighboring lower pixel and the neighboring left-hand side pixel may be pixels P5, P6, P7 and P8 which are located a few pixels away respectively from the pixel above, the pixel to the right-hand side of, the pixel below, and the pixel to the left-hand side of the objective pixel as shown in FIG. 8B.

The neighboring upper pixel, the neighboring right-hand side pixel, the neighboring lower pixel and the neighboring left-hand side pixel are each smoothed out in an area (i.e., a smoothing area) which is larger than the size of each halftone dot around each neighboring pixel of an original image. The reason for setting the smoothing area larger than the size of the halftone dots is to prevent detection of the configurations of the halftone dots, and hence, a large difference between a density value of a pixel which is close to the center of a halftone dot and a pixel which is not close to the center of a halftone dot, and to thereby obtain a density value the original image originally has.

The smoothing processing which is performed at this stage is realized by simple or weighted averaging of density values of pixels which are located within the smoothing area. An average density value with respect to the neighboring upper pixel which is obtained in this manner is $Y_U$, an average density value with respect to the neighboring lower pixel which is obtained in this manner is $Y_L$, an average density value with respect to the neighboring left-hand side pixel which is obtained in this manner is $X_L$, and an average density value with respect to the neighboring right-hand side pixel which is obtained in this manner is $X_R$. The smoothing processing portion 12 provides a contrast extracting portion 15 with the average density values $Y_U$, $Y_L$, $X_L$ and $X_R$ with respect to the neighboring upper pixel, the neighboring lower pixel, the neighboring left-hand side pixel and the neighboring right-hand side pixel, respectively.

The contrast extracting portion 15 extracts a contrast C in the vicinity of the objective pixel of the image based on the average density values $Y_U$, $Y_L$, $X_L$ and $X_R$. In other words, the contrast C is calculated by:

$$C = \frac{|Y_U - Y_L| + |X_L - X_R|}{2} \qquad \text{Eq. 2}$$

The equation Eq. 2 is used for averaging a contrast in a vertical direction and a contrast in a horizontal direction of the objective pixel. The calculated contrast C is supplied to the table reference portion 20.

In general, a large contrast denotes an edge portion of an image while a small contrast denotes a flat portion of the image where a density change is small.

Hence, by calculating the contrast in the vicinity of the objective pixel as described above, it is possible to judge what kind of portion of the image the objective pixel represents. Further, since the smoothing processing portion 12 executes smoothing processing, an edge of a halftone dot itself will not be detected.

Figure 9:
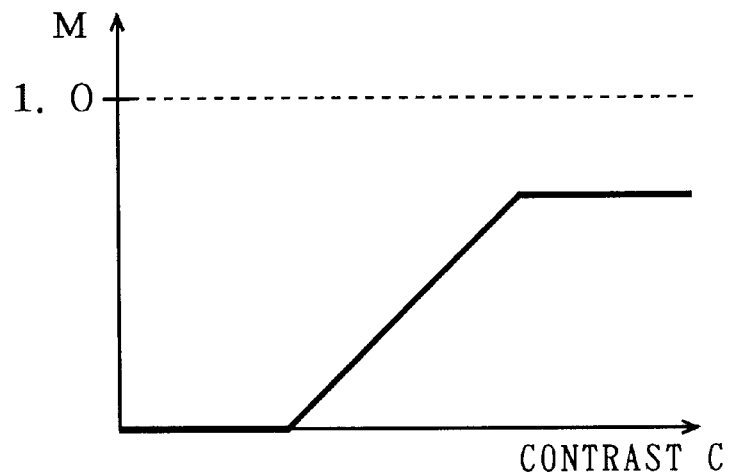
FIG. 9 is a view showing a relationship between a contrast and a mixing rate in the third preferred embodiment.

The table reference portion 20 identifies the mixing rate M in accordance with the contrast C which is supplied thereto. FIG. 9 shows a relationship between the contrast C and the mixing ratio M. As shown in FIG. 9, a possible value of the mixing rate M is in the range of "$0 \leq M < 1$". Hence, the value of the mixing rate M becomes larger as the contrast C becomes larger, whereas the value of the mixing rate M becomes smaller as the contrast C becomes smaller. In other words, the value of the mixing rate M is large when the objective pixel represents an edge portion of an image, whereas when the objective pixel represents a flat portion of the image where a density change is small, the value of the mixing rate M is small.

The table reference portion 20 stores a table which represents the relationship which is shown in FIG. 9 in a storage element such as a memory. Receiving the contrast C, the table reference portion 20 refers to the table and acquires the corresponding mixing rate M. Since the mixing rate M which is obtained in this manner indicates a rate at which the main signal S is mixed into the output signal, the table reference portion 20 identifies the mixing rate (1−M) for the filtered signal S' based on the mixing rate M. Hence, a possible value of the mixing rate (1−M) is in the range of "0<(1−M)≦1". Following this, the mixing rate M is supplied to the multiplier 51, while the mixing rate (1−M) is supplied to the multiplier 52.

The multiplier 51 multiplies the main signal S by the mixing rate M, thereby generating the signal Sa (=M·S). The signal Sa is supplied to the adder 53.

On the other hand, the filter computation portion 30 executes filter computation using an image filter which has a predetermined size. An image filter which is used at this stage is an image filter as that shown in FIG. 13 which is similar to an image filter which is used in the conventional image processing apparatus. In the image processing apparatus according to the third preferred embodiment as well, it is preferable that the size of an image filter which is used in the filter computation portion 30 is set to be about double the size of or larger than the size of each halftone dot. In the case of the image filter which is shown in FIG. 13, for instance, the size of one pixel is about "⅖" of the size of halftone dots or larger. The filter computation portion 30 aligns the center of the image filter to an objective pixel, executes the computation which is shown as Eq. 1 based on weighting factors which are assigned to the objective pixel and neighboring pixels around the same to thereby calculate a weighted mean, and outputs the weighted mean as the filtered signal S'. A frequency component of a halftone dot pattern is removed from the filtered signal S' so as to calculate the weighted means in an area which is larger than the size of the halftone dots, and therefore, the filtered signal S' has a density value from which an influence of the halftone dots is removed. Hence, a cause of moires and a deterioration in an image quality is removed from the filtered signal S'. The filtered signal S' which is obtained in this manner is supplied to the multiplier 52.

Following this, the multiplier 52 multiplies the filtered signal S' by the mixing rate (1−M), and generates the signal Sb (=(1−M)·S'). The obtained signal Sb is supplied to the adder 53.

The adder 53 mixes (adds) the signal Sa and the signal Sb with each other, thereby generating the output signal S". The output signal S" is an output signal from the image processing apparatus according to the third preferred embodiment.

In the image processing apparatus according to the third preferred embodiment, the main signal S and the filtered signal S' are mixed with each other at the mixing ratio of "M:(1−M)". This mixing ratio is determined in accordance with the contrast C in the vicinity of the objective pixel. This makes it possible to change the mixing ratio in accordance with the contrast C of an original image. Hence, it is possible to change the effect of image processing using an image filter in accordance with the contrast C of the original image.

Further, since the image processing apparatus according to the second preferred embodiment requires to set a proportion of the main signal S large when the objective pixel represents an edge portion of an image, the output signal S" which is outputted contains relatively many components of the main signal S, and therefore, the edge portion of the image is not degraded. In addition, since a proportion of the filtered signal S' is set large when the objective pixel represents a flat portion in which a density change of the image is small, the output signal S" which is outputted contains relatively many components of the filtered signal S', and therefore, it is possible to prevent moires and a deterioration in an image quality.

In FIG. 9, the mixing rate M is not "1" for a case where the contrast C is sufficiently large. This is to allow the output signal S" to contain about a minimum amount of the filtered signal S' so that an influence of the halftone dots is removed to an extent that an edge is not degraded. As a result, moires which actually exist are removed, although not visually noticeable.

<6. Fourth Preferred Embodiment>

Figure 10:
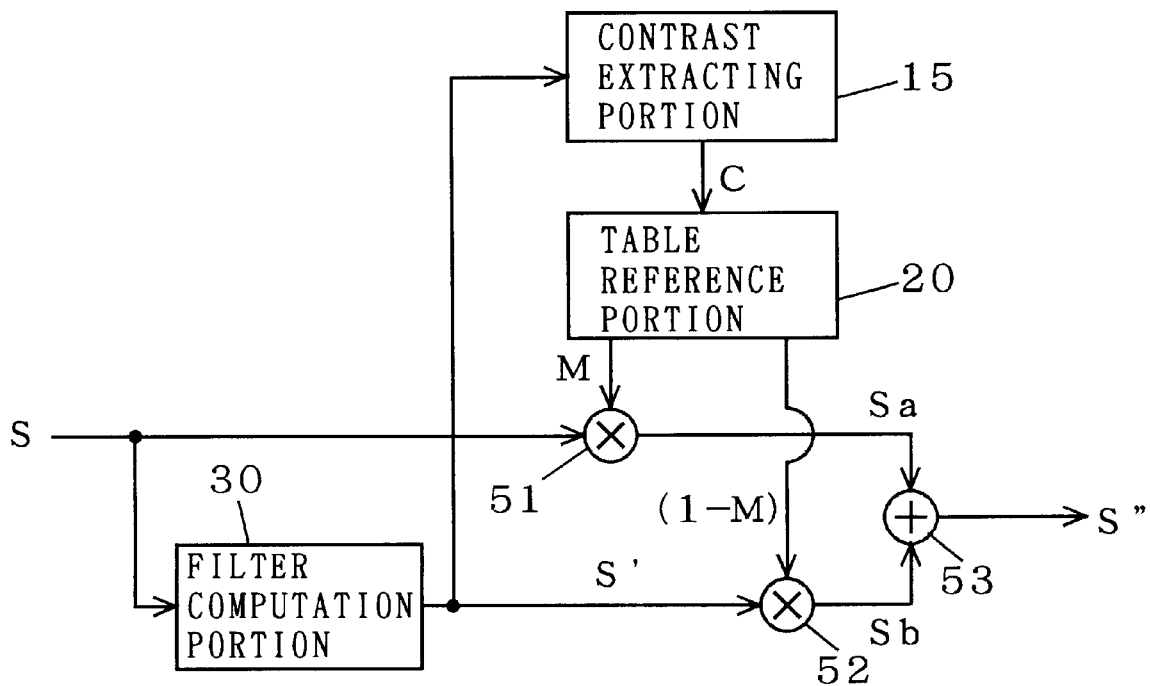
FIG. 10 is a schematic structure diagram of an image processing apparatus according to a fourth preferred embodiment of the present invention.
Figures 14A, 14B, 14C:
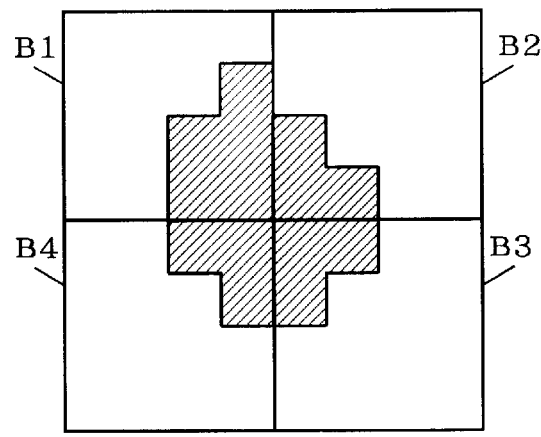
FIGS. 14A, 14B and 14C are views showing a conventional method of generating one halftone dot.

Now, an image processing apparatus according to a fourth preferred embodiment of the present invention will be described. FIG. 10 is a schematic structure diagram of an image processing apparatus according to the fourth preferred embodiment. The main signal S regarding an objective pixel is supplied to the filter computation portion 30 and the multiplier 51.

As in the precedent preferred embodiments, the filter computation portion 30 executes filter computation using an image filter which has a predetermined size. An image filter which is used at this stage is an image filter as that shown in FIG. 13 which is similar to an image filter which is used in the conventional image processing apparatus. In the image processing apparatus according to the fourth preferred embodiment as well, it is preferable that the size of an image filter which is used in the filter computation portion 30 is set to be about double the size of or larger than the size of each halftone dot. The filter computation portion 30 executes the computation which is shown as Eq. 1 based on weighting factors which are assigned to the objective pixel and neighboring pixels around the same to thereby calculate a weighted mean, and outputs the weighted mean as the filtered signal. A frequency component of a halftone dot pattern is removed from the filtered signal S' so as to calculate the weighted means in an area which is larger than the size of the halftone dots, and therefore, the filtered signal S' has a density value from which an influence of the halftone dots is removed. Hence, a cause of moires and a deterioration in an image quality is removed from the filtered signal.

By the way, the filter computation portion 30 of the image processing apparatus according to the fourth preferred embodiment generates filtered signals regarding the neighboring pixels around the objective pixel, in addition to the main signal regarding the objective pixel. The neighboring pixels may be four neighboring pixels around the objective pixel of the neighboring upper pixel, the neighboring lower pixel, the neighboring left-hand side pixel and the neighboring right-hand side pixel, for example, as described in relation to the third preferred embodiment. A filter signal regarding each one of the neighboring upper pixel, the neighboring lower pixel, the neighboring left-hand side pixel and the neighboring right-hand side pixel is generated. The filter signals regarding the neighboring upper pixel, the neighboring lower pixel, the neighboring left-hand side pixel and the neighboring right-hand side pixel are each supplied to the contrast extracting portion 15. Meanwhile, the filtered signal S' regarding the objective pixel is supplied to the multiplier 52.

The contrast extracting portion 15 extracts the contrast C in the vicinity of the objective pixel, based on the filter signals regarding the neighboring upper pixel, the neighboring lower pixel, the neighboring left-hand side pixel and the neighboring right-hand side pixel. A method of obtaining the contrast C may be similar to that described in relation to the third preferred embodiment. The contrast C which is obtained in this manner is supplied to the table reference portion 20.

The table reference portion 20 identifies the mixing rate M in accordance with the contrast C which is supplied thereto. The details of the table reference portion 20 are also similar to that described in relation to the third preferred embodiment. Since the mixing rate M which is obtained in this manner indicates a rate at which the main signal S is mixed into the output signal, the table reference portion 20 identifies the mixing rate (1−M) for the filtered signal S' based on the mixing rate M. Following this, the mixing rate M is supplied to the multiplier 51, while the mixing rate (1−M) is supplied to the multiplier 52.

The multiplier 51 multiplies the main signal S by the mixing rate M, thereby generating the signal Sa (=M·S) which will be then supplied to the adder 53. The multiplier 52 multiplies the filtered signal S' by the mixing rate (1−M), and generates the signal Sb (=(1−M)·S'). The signal Sb which is obtained in this manner is thereafter supplied to the adder 53.

The adder 53 mixes the signal Sa and the signal Sb with each other, thereby generating the output signal S". The output signal S" is an output signal from the image processing apparatus according to the fourth preferred embodiment.

In the image processing apparatus according to the fourth preferred embodiment, the filter signals regarding the neighboring pixels around the objective pixel are supplied to the contrast extracting portion 15, the contrast is thereafter calculated, and the mixing rates M and (1−M) are created in accordance with the calculated contrast. The filter signals regarding the neighboring pixels around the objective pixel are signals which are obtained by weighted averaging as that indicated by Eq. 1 based on an image filter as that shown in FIG. 13. Hence, even if the filtered signals which are obtained by weighted averaging are used instead of the average density value which has been described in relation to the third preferred embodiment, the same effect is realized in the output signal S". Rather, if the filtered signals are supplied to the contrast extracting portion 15 as in the fourth preferred embodiment, it is not necessary to dispose the smoothing processing portion 12 (See FIG. 7) which has been described in relation to the third preferred embodiment, and therefore, the structure is efficient and beneficial.

Thus, in the image processing apparatus according to the fourth preferred embodiment as well, the main signal S and the filtered signal S' are mixed with each other at the mixing ratio of "M:(1−M)", the output signal S" is consequently generated, and the mixing ratio is determined in accordance with the contrast. This makes it possible to change the mixing ratio in accordance with the contrast of an original image which is not affected by an influence of the halftone dots. Hence, it is possible to change the effect of image processing using an image filter in accordance with the contrast of the original image.

Further, since the image processing apparatus according to the fourth preferred embodiment requires to set a proportion of the main signal S large when the objective pixel represents an edge portion of an image, the output signal S" which is outputted contains relatively many components of the main signal S, and therefore, the edge portion of the image is not degraded. In addition, since a proportion of the filtered signal S' is set large when the objective pixel represents a flat portion in which a density change of the image is small, the output signal S" which is outputted contains relatively many components of the filtered signal S', and therefore, it is possible to prevent moires and a deterioration in an image quality.

<7. Modification>

While the foregoing has described that the size of an image filter which is used in the filter computation portion 30 of the image processing apparatuses according to the first and the second preferred embodiments is larger than the size of halftone dots, the halftone dot size may be different depending on an original image. Therefore, when the size of the halftone dots of the original image is changed, it is necessary to change the size of the image filter to a proper size.

If the halftone dot size is measured and changed while the image inputting portion 100 reads an original image, or if an operator sets and enters the halftone dot size through the operation inputting portion 201 when the operator sets the original image to the image inputting portion 100, halftone dot information regarding the halftone dot size are acquired. The halftone dot information which are acquired in this manner are supplied to the image processing apparatus. Following this, in the image processing apparatus, the filter computation portion changes the size of an image filter to use based on the inputted halftone dot information. This makes it possible to deal with the changed halftone dot size immediately after the halftone dot size of the original image is changed.

The first and the second preferred embodiments have been described in relation to a case where the value of the mixing rate M is small when the average density value D or the filtered signal S' belongs to the high density range or the low density range but the mixing rate M has a large value when the average density value D or the filtered signal S' belongs to the middle density range, as one example. However, the first and the second preferred embodiments are not limited to satisfy such a relationship. Rather, it is only necessary to ensure that a proportion of the filtered signal S' is eventually large when the average density value D or the filtered signal S' indicates the high density range or the low density range but a proportion of the main signal S is eventually large when the average density value D or the filtered signal S' indicates the middle density range.

In addition, in the first and the second preferred embodiments, if the table reference portion 20 stores an optional relationship other than the relationship which is shown in FIG. 5, it is possible to change the effect of the image processing using an image filter in an optional density range. Hence, with the image processing apparatuses according to the first and the second preferred embodiments, it is possible to avoid a deterioration in an image quality, moires and the like in the optional density range.

Further, the third and the fourth preferred embodiments have been described in relation to a case where the value of the mixing rate M becomes larger as the contrast C becomes larger but the value of the mixing rate M becomes smaller as the contrast C becomes smaller as shown in FIG. 9, as one example. However, the third and the fourth preferred embodiments are not limited to satisfy such a relationship. Rather, it is only necessary to ensure that a proportion of the filtered signal S' is eventually large when the contrast C is large but a proportion of the main signal S regarding the objective pixel is eventually large when the contrast C is small.

Further, with respect to extraction of the contrasts in the third and the fourth preferred embodiments, while the foregoing has described that contrasts are extracted in two directions of the vertical direction and the horizontal direction, it is more preferable to further extract a contrast in an oblique direction. For example, if neighboring pixels around the objective pixel which are in an oblique direction which is diagonal to the upper right and an oblique direction which is diagonal to the upper left are further referred during extraction of the contrasts, the contrasts are extracted at an improved accuracy. Hence, excellent preservation of an edge is possible.

Still further, with respect to extraction of the contrasts in the third and the fourth preferred embodiments, a contrast may be extracted in other direction except for the vertical direction, the horizontal direction and an oblique direction. More precisely, in general terms, it is only necessary that the directions are different from each other about the objective pixel in a two-dimensional expansion.

In general terms, the image filter which is used in the image processing apparatus described above is an M×N image filter (M and N are integers which are equal to or larger than 3), and the objective pixel is placed at a central portion of the image filter.

The foregoing is not limited to a halftone dot original which represents an original image which is recorded in halftone dots. When moires or the like exist in an image of other types, similar processing as well makes excellent suppression of a degraded image quality and removal of the moires possible, without deteriorating an edge of the image. The present invention is also applicable to image processing of an image which is obtained by a digital camera, for instance.

While the invention has been described in detail, the foregoing description is in all aspects illustrative and not restrictive. It is understood that numerous other modifications and variations can be devised without departing from the scope of the invention.

We claim:

1. An image processing method of applying predetermined processing to an original image pixel by pixel comprising the steps of:
   (a) applying an image filter which has a predetermined size to a main signal representing a density of an objective pixel to generate a filtered signal;
   (b) obtain in a mixing ratio for mixing said main signal and said filtered signal with each other; and
   (c) mixing said main signal and said filtered signal with each other based on said mixing ratio to generate an output signal;
   wherein said step b) comprises the steps of:
      b-1) calculating average density values from a pixel group which contains said objective pixel and neighboring pixels a round said objective pixel; and
      b-2) obtaining said mixing ratio in accordance with said average density values; and
      wherein said mixing ratio is determined in such a manner that a mixing weight of said filtered signal is dominant when said average density values are in a high density range or a low density range but a mixing weight of said main signal is dominant when said average density values are in a middle density range.

2. The image processing method of claim 1, wherein said step b) comprises the step of
   b-1) obtaining said mixing ratio in accordance with a value of said filtered signal.

3. An image processing method of applying predetermined processing to an original image pixel by pixel, comprising the steps of:
   (a) applying an image filter which has a predetermined size to a main signal representing a density of an objective pixel to generate a filtered signal;
   (b) obtaining a mixing ratio for mixing said main signal and said filtered signal with each other; and
   (c) mixing said main signal and said filtered signal with each other based on said mixing ratio to generate an output signal
   wherein said step b) comprises the step of
      b-1) obtaining said mixing ratio in accordance with a value of said filtered signal; and
      wherein said mixing ratio is determined in such a manner that a mixing weight of said filtered signal is dominant when said filtered signal belongs to a high density range or a low density range but a mixing weight of said main signal is dominant when said filters signal belongs to a middle density range.

4. An image processing method of applying predetermined processing to an original image pixel by pixel, comprising the steps of:
   (a) applying an image filter which has a predetermined size to a main signal representing a density of an objective pixel to generate a filtered signal;
   (b) obtaining a mixing ratio for mixing said main signal and said filtered signal with each other; and
   (c) mixing said main signal and said filtered signal with each other based on said mixing ratio to generate an output signal;
   wherein said step b) comprises the steps of:
      b-1) performing smoothing processing on each one of a plurality of neighboring pixels which are located in the vicinity of said objective pixel, in a predetermined region around each one of said plurality of said neighboring pixels, to thereby calculate an average density value regarding each one of said plurality of said neighboring pixels;
      b-2) calculating a contrast regarding said objective pixel based on a plurality of said average density values which are obtained from said plurality of said neighboring pixels; and
      b-3) obtaining said mixing ratio in accordance with said contrast.

5. The image processing method of claim 4, wherein said mixing ratio is determined in such a manner that a mixing weight of said filtered signal becomes larger as said contrast becomes smaller but a mixing weight of said main signal becomes larger as said contrast becomes larger.

6. An image processing method of applying predetermined processing to an original image pixel by pixel, comprising the steps of:
   (a) applying an image filter which has a predetermined size to a main signal representing a density of an objective pixel to generate a filtered signal;
   (b) obtaining a mixing ratio for mixing said main signal and said filtered signal with each other, and
   (c) mixing said main signal and said filtered signal with each other based on said mixing ratio to generate an output signal;
   wherein said step a) comprises the step of
      a-1) applying an image filter which has a predetermined size to a plurality of neighboring pixels which are located in the vicinity of said objective pixel to generate filtered signals, and said step b) comprises the steps of:
- b-1) calculating a contrast regarding said objective pixel based on said filtered signals regarding said plurality of said neighboring pixels which are located in the vicinity of said objective pixel; and
- b-2) obtaining said mixing ratio for mixing said main signal regarding said objective pixel and said filtered signals in accordance with said contrast.

7. The image processing method of claim 6, wherein said mixing ratio is determined in such a manner that a mixing weight of said filtered signal becomes larger as said contrast becomes smaller but a mixing weight of said main signal becomes larger as said contrast becomes larger.

8. An image processing apparatus for applying predetermined processing to an original image pixel by pixel, comprising:
- a) means for applying an image filter which ha s a predetermined size to a main signal representing a density of an objective pixel to penerate a filtered signal;
- b) means for obtaining a mixing ratio for mixing said main signal and said filtered signal with each other; and
- c) means for mixing said main signal and said filtered signal based on said mixing ratio with each other to generate an outut signal;

wherein said means b) comprises:
- b-1) means for calculating average density values from a pixel group which contains said objective pixel and neighboring pixels around said objective pixel; and
- b-2) means for obtaining said mixing ratio in accordance with said average density values; and wherein said mixing ratio is determined in such a manner that a mixing weight of said filtered signal is dominant when said average density values are in a high density range or a low density range but a mixing weight of said main signal is dominant when said average density values are in a middle density range.

9. The image processing apparatus of claim 8, wherein said means b) comprises
- b-1) means for obtaining said mixing ratio in accordance with a value of said filtered signal.

10. An image processing apparatus for applying predetermined processing to an original image pixel by pixel, comprising:
- a) means for applying an image filter which has a predetermined size to a main signal representing a density of an objective pixel to generate a filtered signal;
- b) means for obtaining a mixing ratio for mixing said main signal and said filtered signal with each other; and
- c) means for mixing said main signal and said filtered signal based on said mixing ratio with each other to generate an output signal;

wherein said means b) comprises
- b-1) means for obtaining said mixing ratio in accordance with a value of said filtered signal; and wherein said mixing ratio is determined in such a manner that a mixing weight of said filtered signal is dominant when said filtered signal belongs to a high density range or a low density range but a mixing weight of said main signal is dominant when said filtered signal belongs to a middle density range.

11. An image processing apparatus for applying predetermined processing to an original image pixel by pixel, comprising:
- a) means for applying an image filter which has a predetermined size to a main signal representing a density of an objective pixel to generate a filtered signal;
- b) means for obtaining a mixing ratio for mixing said main signal and said filtered signal with each other; and
- c) means for mixing said main signal and said filtered signal based on said mixing ratio with each other to generate an output signal;

wherein said means b) comprises:
- b-1) means for performing smoothing processing on each one of a plurality of neighboring pixels which are located in the vicinity of said objective pixel, in a predetermined region around each one of said plurality of said neighboring pixels, to thereby calculate an average density value regarding each one of said plurality of said neighboring pixels;
- b-2) means for calculating a contrast regarding said objective pixel based on a plurality of said average density values which are obtained from said plurality of said neighboring pixels; and
- b-3) means for obtaining said mixing ratio in accordance with said contrast.

12. The image processing apparatus of claim 11, wherein said mixing ratio is determined in such a manner that a mixing weight of said filtered signal becomes larger as said contrast becomes smaller but a mixing weight of said main signal becomes larger as said contrast becomes larger.

13. An image an processing apparatus for applying predetermined processing to an original image pixel by pixel comprising:
- a) means for applying an image filter which has a predetermined size to a main signal representing a density of an objective pixel to generate a filtered signal;
- b) means for obtaining a mixing ratio for mixing said main signal and said filtered signal with each other; and
- c) means for mixing said main signal and said filtered signal based on said mixing ratio with each other to generate an output signal;

wherein said means a) comprises
- a-1) means for applying an image filter which has a predetermined size to a plurality of neighboring pixels which are located in the vicinity of said objective pixel to generate filtered signals, and said means b) comprises:
- b-1) means for calculating a contrast regarding said objective pixel based on said filtered signals regarding said plurality of said neighboring pixels which are located in the vicinity of said objective pixel; and
- b-2) means for obtaining said mixing ratio for mixing said main signal regarding said objective pixel and said filtered signals in accordance with said contrast.

14. The image processing apparatus of claim 13, wherein said mixing ratio is determined in such a manner that a mixing weight of said filtered signal becomes larger as said contrast becomes smaller but a mixing weight of said main signal becomes larger as said contrast becomes larger.

* * * * *